June 29, 1948.                E. ROSTAS                2,444,066
                      TUNER FOR CAVITY RESONATORS
                          Filed June 3, 1943
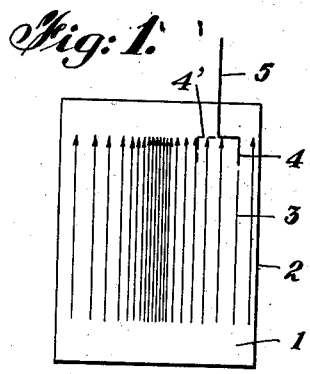
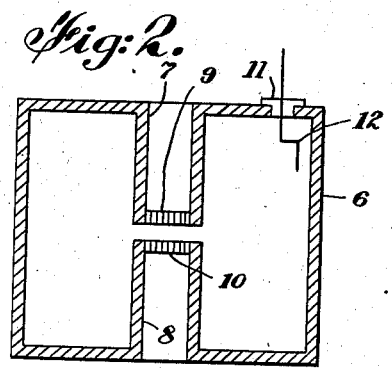
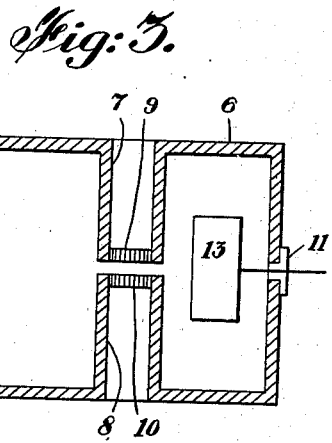
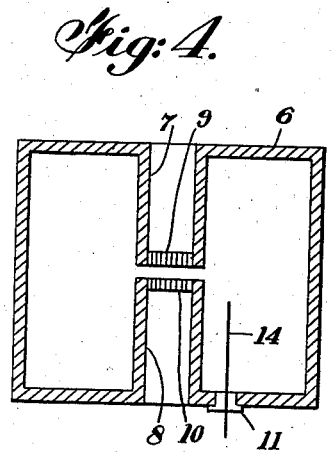
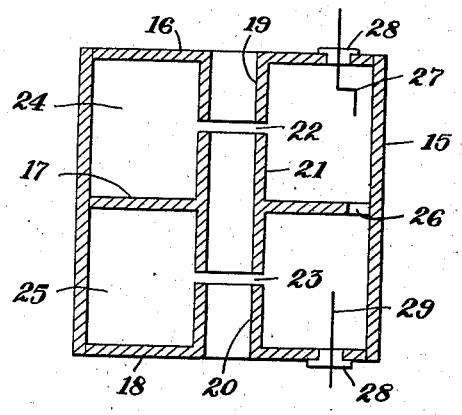
INVENTOR.
ERNEST ROSTAS
BY
AGENT Patented June 29, 1948

2,444,066

UNITED STATES PATENT OFFICE 2,444,066

TUNER FOR CAVITY RESONATORS

Ernest Rostas, Lyon, France, assignor to International Standard Electric Corporation, New York, N. Y., a corporation of Delaware Application June 3, 1943, Serial No. 489,474
In France May 11, 1940

Section 1, Public Law 690, August 8, 1946
Patent expires May 11, 1960

6 Claims. (Cl. 250—27.5)

The invention relates to systems for the adjustment of resonant cavities. The resonance of a cavity intended to serve as an electric resonator may be adjusted by varying the volume of this cavity either by means of a sliding piston, the surface of which forms one wall of the cavity, or else by mechanically deforming one or more walls of this cavity elastically or permanently. Such methods of adjustment bring about a variation of the entire shape of the cavity; this is frequently troublesome and requires devices (pistons, gripping or locking jaws, etc.) which take up a relatively large amount of space in systems containing such cavities.

One object of the invention is the provision, for the adjustment of the electric resonance of a cavity, of means that necessitate no change of shape and practically no change of volume of such a cavity.

According to certain of its characteristic features, the invention provides for the adjustment of a resonant cavity in which an electric field is set up, and the modification of the configuration of this electric field or the deformation of its lines of force, in part at least, in such a way as to obtain the desired resonance.

According to one feature of the invention, such a deformation or modification of an electric field within a resonant cavity is effected by the shifting of a metallic or dielectric member within this cavity.

The invention is explained in detail in the following description with reference to the appended drawings in which:

Fig. 1 illustrates one example of a resonant cavity provided with a means of adjustment according to certain features of the invention;

Figs. 2 and 3 illustrate two examples of the application of the adjustment means of Fig. 1 to resonant cavities.

Fig. 4 shows another example of an adjustment means, according to certain features of the invention, of the resonance of a cavity similar to that of Figs. 2 and 3, and Fig. 5 illustrates an assembly of two resonant cavities whose adjustment is effected according to features of the invention and which is particularly intended to serve as an oscillatory circuit in an electron discharge device having modulation of velocity of the electrons.

Referring to Fig. 1, this shows a resonant cavity 1 delimited by a dielectric discontinuity 2, for example a conductive wall, with an electric field within it. The distribution of this field is designated by lines of electric force 3, the variable spacing of which indicates the density of the field in the various regions of cavity 1. For example, Fig. 1 shows the field to be of great density around the axis of the space within the limits 2, which is assumed to be cylindrical, and this density diminishes as the walls 2 are approached.

This cavity has an inherent electric resonance which depends, as is known, on its physical dimensions and on the distribution of the electric field within it. It has hitherto been the regular practice to modify the electric resonance of a space of this kind by acting on its physical dimensions, for example by using a piston as one terminal wall of cylinder 2, which results in modifications of the electrical distribution within it.

On the contrary and according to certain of its features, the present invention provides means, not for substantially modifying the shape and the material dimensions of the said space, but for acting directly on the distribution of the electric field within it. For example, as shown in Fig. 1, a conductive or dielectric elbow rod 4—5 (which may also be an angle plate or an element of different asymmetrical shape) may be provided within the cavity 1, the rod 5 passing through the wall in order to permit control of the position of the elbow portion 4 within the cavity. The presence of this rod 4—5 will evidently modify the distribution of the electric field 3 within cavity 1, but it is evident that, when there is rotation around rod 5 as an axis, only the elbow portion 4 will then act to modify the distribution of the field and consequently to adjust volume 1 to the desired electric resonance.

In a general way, the invention provides within resonant spaces, the resonance of which it is desired to be able to adjust, an element or a member of such shape that a movement of rotation or translation imparted to it brings it from one position where there is a certain distribution of the lines of force of the electric field to another position where this distribution was originally different, for example from the position indicated at 4 in Fig. 1 by rotation to the position indicated by the dotted lines at 4'.

According to the distribution of the electric field 3, it may be desirable to push in or pull out portion 5 with or without rotating, the position of portion 4 in order to bring the member 4 into a portion of the electric field of different intensity.

Figs. 2, 3 and 4 show some examples of the application of the invention in the case of a special resonant space particularly intended to serve as a resonant cavity or rhumbatron in an electron velocity modulation tube.

In these drawings the resonant cavity is toroidal and is delimited by a wall 6 that is reentrant at 7 and 8 in such a way as to form two axial channels. Openings which may be in the form of grids 9 and 10 are provided at the ends facing these channels. In one of the plane faces of the wall 6 there is provided a screw 11 or other supporting member which can be rotated and which carries within the toroidal space a bent member or rod 12, for example of elbow shape like a crank, the rotation of which in the electric field (not shown) set up within the cavity will permit adjustment of the electric resonance of the cavity.

Instead of a bent rod or member such as 12, it is evident that the element for adjusting the electric resonance may consist of a closed loop or of a conductive or dielectric plate rotated in the electric field that exists within the cavity. A loop of this kind is shown at 13 in Fig. 3.

For adjusting the electric resonance in a resonant space of this kind, it may suffice to simply modify the length by which a rod or plate of conductive or dielectric material penetrates in such a way as to modify the electric field in the vicinity of the central discontinuity 9—10 of the space as shown at 14 in Fig. 4.

Fig. 5 shows an example of the application of a resonant adjustment device that incorporates features of the invention to an oscillatory circuit of a velocity modulated electron discharge system of the type called "klystron."

In this Fig. 5, the oscillatory circuit comprises an outer cylinder 15 in which three transverse walls 16, 17 and 18 are arranged in intimate electrical and mechanical contact therewith effected in any suitable manner. The end transverse walls 16 and 18 both have a tubular reentrant portion 19 and 20, and the mid-wall 17 comprises a tubular portion 21 that extends on each side of the wall in order to cooperate with the tubular portions 19 or 20 and thus produce constrictions 22 and 23 respectively in the spaces or cavities 24 and 25 that are thus delimited. Furthermore, the mid-wall 17 has slots, such as those shown at 26, for the direct coupling of the two spaces 24 and 25.

The problem is to bring the two two spaces 24 and 25 to the same electric resonance. For this purpose, space 24, for example, is provided with a resonance adjustment means according to one variation of the invention. This means consists, for example, of an elbow rod 27 which is carried by plug 28 and the position of which can be adjusted by the same.

However, as the two spaces 24 and 25 are constructed in such a way as to be as identical as possible in order to permit such adjustment, it is necessary to likewise change the resonance of space 25 by the same amount by which that of space 24 is changed as a result of the presence of the elbow rod 27 in its mid-position. This is effected, for example, by means of a rod like 29 as shown in the drawing. This rod may even be made adjustable, if desired, in the way shown in Fig. 4.

Although the invention has been described for certain particular examples, it is evident that it is by no means limited thereto, but may on the contrary undergo numerous modifications and adaptations without departing from its scope. It consists essentially in adjusting the electric resonance of a cavity by modification of the distribution of the electric field within it.

What is claimed is:

1. A cavity resonator having a restricted central portion constituting part of the electron path and an enlarged outer portion surrounding said central portion, comprising means for adjusting the resonance of the cavity resonator which includes an electric field deforming member asymmetrically located in the outer part of the cavity resonator and movable therein for adjustment between positions of different electric field intensity, said electric field deforming member comprising a central rotatable axis member extending from the interior of the cavity resonator to the exterior thereof and an offset portion extending radially from said axis member and lying within said cavity resonator, whereby rotation of said axis member causes said offset portion to assume a series of positions asymmetrically related to one another and to the electric field within said cavity resonator.

2. A cavity resonator consisting of a first and a second cavity resonator element through which elements an electron stream is to be passed in sequence, comprising means for obtaining identical resonant frequencies in the said cavity resonator elements, said means comprising an electric field deforming member asymmetrically located with respect to the axis of said field movably mounted in the first cavity resonator for adjustment between positions of different electric field intensity, said electric field deforming member comprising a central rotatable axis member extending from the interior of the first cavity resonator element to the exterior thereof and an offset portion extending radially from the said axis member and lying within said first cavity resonator element, whereby rotation of said axis member causes said offset portion to assume a series of positions asymmetrically related to one another and to the electric field within said cavity resonator.

3. A cavity resonator as set forth in claim 1, including a second discrete field deforming member mounted in the second cavity resonator element.

4. A cavity resonator comprising means for adjusting the resonance of the cavity resonator including a member for deforming the electric field in said cavity resonator, said member being asymmetrically located with respect to the axis of said field and movable therein for adjusting between positions of different field intensity, said electric field deforming member comprising a central rotatable axis member extending from the interior of the cavity resonator to the exterior thereof and an offset portion extending radially from said axis member and lying within said cavity resonator, whereby rotation of said axis member causes said offset portion to assume a series of positions asymmetrically related to one another to the electric field within said cavity resonator.

5. A cavity resonator comprising means for adjusting the resonance of the cavity resonator, said means including a member for deforming the electric field in said cavity resonator, said member being asymmetrically located with respect to the axis of said field and movable therein for adjustment between positions of different field intensity, said electric field deforming member comprising a central rotatable axis member extending from the interior of the cavity resonator to the exterior thereof and an offset portion extending radially from said axis member lying within said cavity resonator and comprising a first member extending radially from said axis member and a second member extending at an angle from said first member.

6. A cavity resonator as set forth in claim 5, in which said second member has its axis parallel to the axis of said axis member.

ERNEST ROSTAS.

REFERENCES CITED

The following references are of record in the file of this patent:

UNITED STATES PATENTS

| Number | Name | Date |
| --- | --- | --- |
| 1,913,978 | Ewen | June 13, 1933 |
| 2,259,690 | Hansen et al. | Oct. 21, 1941 |
| 2,280,824 | Hansen et al. | Apr. 28, 1942 |
| 2,281,717 | Samuel | May 5, 1942 |
| 2,306,282 | Samuel | Dec. 22, 1942 |
| 2,323,729 | Ryan | July 6, 1943 |
| 2,342,897 | Goldstine | Feb. 29, 1944 |
| 2,356,414 | Linder | Aug. 22, 1944 |